(12) United States Patent
Hamdan et al.

(10) Patent No.: US 7,398,527 B2
(45) Date of Patent: Jul. 8, 2008

(54) DISPATCHING APPLICATION STEPS OF AN APPLICATION RUNNING ON AN APPLICATION SERVER IN A CLIENT/SERVER ENVIRONMENT

(75) Inventors: Amen Hamdan, Stuttgart (DE); Fritz Hohl, Stuttgart (DE)

(73) Assignee: Sony Deutschland GmbH, Cologne (DE)

(*) Notice: Subject to any disclaimer, the term of this patent is extended or adjusted under 35 U.S.C. 154(b) by 872 days.

(21) Appl. No.: 10/437,678

(22) Filed: May 14, 2003

(65) Prior Publication Data

US 2003/0217104 A1 Nov. 20, 2003

(30) Foreign Application Priority Data

May 15, 2002 (EP) .................................. 02010836

(51) Int. Cl.
G06F 9/46 (2006.01)
G06F 15/16 (2006.01)
G06F 9/54 (2006.01)

(52) U.S. Cl. ..................... 719/311; 719/315; 719/316; 719/330

(58) Field of Classification Search ................. 719/315, 719/316, 330, 311
See application file for complete search history.

(56) References Cited

U.S. PATENT DOCUMENTS 6,016,516 A 1/2000 Horikiri
6,052,710 A 4/2000 Saliba et al.
6,173,327 B1* 1/2001 De Borst et al. ............ 709/231
6,353,839 B1* 3/2002 King et al. .................. 715/513
6,356,933 B2 3/2002 Mitchell et al.

FOREIGN PATENT DOCUMENTS

| GB | 2 329 734 | 3/1999 |
| WO | WO 99 03036 | 1/1999 |
| WO | WO 01 95107 | 12/2001 |
| WO | WO 02 13010 | 2/2002 |

* cited by examiner

Primary Examiner—Li B Zhen
(74) Attorney, Agent, or Firm—Oblon, Spivak, McClelland, Maier & Neustadt, P.C.

(57) ABSTRACT

A method for dispatching steps of an application running on an application server which can be accessed from client terminals. Users select user interaction elements on client terminals, and the interactions are transmitted to the application server executing a main part of an application, which creates output that contains the next set of possible user interactions. Calling application steps can be addressed and invoked by other application steps in order to reuse software components necessary for processing said other application steps. Nesting programming commands used to call another application step are arbitrarily nested and serve as a called sub-routine within the calling application step. Values are returned to the calling application step, and nesting paths of called application steps are discarded in case a user switches to another application.

10 Claims, 6 Drawing Sheets

DISPATCHING APPLICATION STEPS OF AN APPLICATION RUNNING ON AN APPLICATION SERVER IN A CLIENT/SERVER ENVIRONMENT

FIELD AND BACKGROUND OF THE INVENTION

The underlying invention generally relates to the field of client/server architectures and distributed processing systems. It pertains e.g. to mobile service portals, application servers and transaction system in heterogeneous telecommunication networks where these applications are employed.

In this context, the invention encompasses research and development issues that are especially directed to client/server architectures enabling users to indirectly interact with an application running on a remote application server by selecting user interaction elements on their terminals with the aid of a client program. These interactions are then transmitted via Internet and/or any corporate network to the application server where the main part of the application is executed, and the application creates output that contains the next set of possible user interactions.

Thereby, an application is defined as a program that executes cycles in which output is transferred to the users and cycles in which it waits for user interactions. It is split up into different parts that are able to handle single user interactions either directly or by using other parts, which are called "steps".

The spread of distributed computing systems has immensely increased over the past years. Distributed computing systems are becoming more and more important, in everyday life as well as in industrial and scientific domains. The Internet and its capabilities enable people to communicate and cooperate all over the world, while high-performance parallel computers or networks of workstations allow to solve scientific and commercial problems faster than ever. Distributed computing environments open up a large spectrum of possibilities for new and exciting applications. Since multimedia is relevant to a wide range of application domains, such as entertainment, information retrieval and business systems, and potentially deployable on a magnitude of end systems, the problem of supporting multimedia is a substantial one. In a distributed environment, the structural description of a multimedia document can be stored apart from the media object content.

Conventional distributed applications are specially designed to be executed on a wide range of platforms ranging from fast desktop computers to mobile laptops and hand-held Personal Digital Assistants (PDAs), spanning several orders of magnitude in processing, storage, and communication capabilities. They reside on (mobile) clients and access or update information from remote servers, thereby using wirebound and/or wireless telecommunication networks.

However, development and deployment still represent a major problem of distributed applications since these applications often exhibit a diverse and unpredictable performance due to their complex and heterogeneous architectures and communication mechanisms. Approaches to simplify the development and deployment processes are the usage of middleware platforms on the one hand, and the integration of online tools on the other hand. In this connection, middleware environments are intended to hide the heterogeneity of distributed systems and provide a platform for enabling the communication between distributed components. Online tools, in contrast, are intended to assist developers and users of distributed environments by supporting the analysis or control of running applications. They can advantageously be used to support the complete "online life cycle" of distributed applications, ranging from development tasks like debugging to subsequent deployment tasks like management of running applications.

With the increased computing and communication power, networks that connect a plurality of distributed workstations are becoming of interest for problem solutions which were formerly reserved to classical parallel computers. Another benefit of distributed computing systems is the permanent and location-transparent accessibility of information, which allows users to cooperate or share information all over the world. From the structural point of view, there are several ways to organize distributed computing systems. An often used paradigm is the client/server principle, which distinguishes one of the participating computers as a server that provides pre-defined services to its clients. More recent approaches have abandoned the client/server principle as the server represents a central point of failure, which decreases the reliability and availability of the overall system. Instead, peer-to-peer computing systems that do not distinguish any of the participating hosts represent a new trend for the development of distributed computing environments. Furthermore, new aspects of distributed computing have arisen with the availability of mobile devices that dynamically connect to networks via wireless communication. Despite the technological advances and independent of the architecture of distributed systems, the development of software remains complex in comparison to software development for stand-alone systems. On the one hand, this complexity results from the diversity of components used for the construction of distributed systems, while, on the other hand, complexity arises from the inherent distribution of the applied components. Important issues in this context are the management of the available resources, the localization of available functionality, the communication between distributed components, and the handling of failure situations. Due to rapid technology transitions and constantly growing requirements for distributed applications, mechanisms for an efficient and reliable building of applications have to be developed. A major contribution to the reduction of development efforts is the usage of middleware platforms. These platforms provide adequate mechanisms to abstract from the underlying computing infrastructure and enable a more or less transparent interaction between application components. Nevertheless, despite the benefits of middleware platforms, further assistance is required in order to rapidly and efficiently develop and deploy distributed applications. For example, during software development, communication between components needs to be traced for debugging or performance analysis purposes. Besides, during the subsequent software deployment, distributed applications need to be managed, and failure situations have to be detected.

BRIEF DESCRIPTION OF THE PRESENT STATE OF THE ART

In the field of client/server architectures and distributed computing systems, a plurality of methods and technologies, which are closely related to the topic of the underlying invention, has been developed. In order to understand the main idea of the underlying invention, it is necessary to briefly explain the main aspects and principles of distributed processing and the concept of processing remote procedure calls.

Distributed processing offers a plurality of advantages in performance, availability and resource sharing. However, managing applications in a distributed environment is a complex task and the lack of integrated performance management facilities is an impediment to large-scale deployment. The Open Distributed Processing Reference Model (RM-ODP), which is a joint standardization effort of the International Standards Organization (ISO) and the International Telecommunications Union (ITU), captures the basis for the evolution of open systems. RM-ODP is a family of general standards and can therefore be utilized for specifying distributed systems. The model is targeted for architecture designers, standardization bodies, and vendor consortia, to guide them in the design of software architectures. The aim of RM-ODP is the development of standards for distributed information processing systems that can be exploited in heterogeneous environments and under multiple organizational domains. In addition to the requirement of using published and standardized interfaces, distributed processing systems are required

- to provide software portability and interoperability,
- to support integration of various systems with different architectures and resources into a whole without costly ad-hoc solutions,
- to accommodate system evolution and run-time changes,
- to federate autonomously administered or technically differing domains,
- to incorporate quality-of-service (QoS) control to failure detection mechanisms,
- to include security service, and
- to offer selectable distribution transparency services.

In distributed processing, the employed object model differs from object models represented for object-oriented programming languages, object-oriented design methodologies, and distributed object management systems. The major differences include

- the flexible use of the object concepts for a variety of abstractions, ranging from implementation details to abstract business model considerations,
- the use of multiple interfaces,
- separation of client and server sides of the interface through which the objects communicate,
- variety of mechanisms for introducing objects to a system,
- concepts related to the type safety of communication through interfaces, and
- interactions between objects are not constrained; they can be asynchronous, synchronous or isochronous, and atomic or non-atomic.

The communication model between distributed processing objects improves the communication primitives offered to programmers by introducing selective distribution transparency. The communication model is realizable through the binding model of objects. Characteristic of reference models for distributed processing is the use of structuring concepts of community, domain and federation. These concepts can be considered to be either static concepts exploitable at design time, or dynamic concepts exploitable at operation time. The conformance statements are mainly required by standardization activities: further standards have to claim suitable conformance testing methods. However, the classification of reference points restricts the areas of conformance testing in such a way that all implementation decisions can not be revealed.

In the following sections, two fundamental approaches a plurality of modern distributed system architectures rely on shall briefly be introduced: the Remote Procedure Call (RPC) concept, standardized by the Internet Engineering Task Force (IETF) standard RFC 1831, and the concept of distributed computing environments.

The concept of a remote procedure call is based on the syntax of local procedure calls. Aside from its unique calling mechanism, the main advantage of a remote procedure call is its easy parameter handling that allows static type checking at compile time, a feature that is not given with pure socket communication. The drawback of remote procedure calls is, though, that despite the syntactical identity with local procedure calls the semantics is not identical. The reason for the different semantics results from the different address spaces, run-time environments, and potentially different life times of the communicating processes. For example, it is not possible to pass pointers as parameters as in local C procedure calls due to separate address spaces. The implementation of remote procedure calls is based on a description of the interface with the remote procedure call language, from which stubs and skeletons for both the client side and the server side are generated by means of a remote procedure call compiler, which take over the arranging and rearranging of parameter sets on both sides, and care for the communication that relies on the Transmission Control Protocol (TCP), the Internet Protocol (IP) or the User Datagram Protocol (UDP). With remote procedure calls, a certain degree of access and location transparency can be reached.

Distributed Computing Environment (DCE) is a recent development of the Open Group. Its purpose is to provide a distribution platform for client/server applications. Thereby, DCE defines an architecture model for applications that is placed on top of the local operating systems. It defines a set of services that are hierarchically structured, so that higher level services are able to use lower level services. The lowest-level service on top of the local operating system is the so-called "Thread Service"; it is based on the POSIX standard 1003.1c and defines an application programming interface (API) for lightweight processes. This API contains functions for creating, manipulating, synchronizing, and deleting threads, and serves as a basis for asynchronous communication. The basic communication service placed above the Thread Service is the remote procedure call described in the previous section. On top of said remote procedure calls, several higher-level services like Time Service, Directory Service, Security Service, and Distributed File Service are available. These services provide functionality for different kinds of general purpose tasks required in most distributed applications. Distributed computing environments themselves are divided into so-called cells, which represent administrative units comprising users, machines, or applications in any arbitrary configuration. The main drawbacks of distributed computing environments are their reliance on remote procedure calls as the only communication mechanism, and its non-object-oriented design (although there are object-oriented extensions to distributed computing environments). Nevertheless, an important contribution of distributed computing environments is their concept of splitting middleware functionality into a set of variably usable services. Moreover, the decentralized and therefore scaleable approach of building organizational cells is of importance for subsequent developments.

Another important, but very different form of middleware are parallel programming environments used for High-Performance Computing and Networking (HPCN). The main goal of these platforms is an efficient communication between parallel processes, while transparency and ease of use originally play a secondary role. First implementations of parallel programming environments are based on a message-passing paradigm—an approach with which all communication is based on exchanging messages. The only fundamental communication operations are the sending and receiving of messages. Later systems pick up the Distributed Shared Memory (DSM) paradigm, which provides an illusion of shared memory within a distributed environment. DSM systems provide the advantage of an improved location transparency and are therefore easier to program, but have problems to reach the efficiency of message-passing systems.

The main objects of both message-passing and DSM systems are efficient execution and communication on heterogeneous hardware, while interoperability and portability have to be maintained. Therefore, parallel programming environments can be classified as low-level middleware, providing only a low degree of transparency regarding the interaction of distributed components. This holds true particularly for message-passing systems, but also in case DSM systems transparency is only achieved at a rather low level of memory access. Higher-level services, for example for dynamically looking up distributed components, are missing.

By contrast, meta-computing infrastructures extend the parallel high-performance computing paradigm to geographically distributed resources. This is either necessary when local resources are no more sufficient for solving hard problems, or when the distribution of resources is inherent, for example in multidisciplinary collaboration environments. The resulting infrastructures are often referred to as grids, which represent higher-latency and lower-bandwidth wide-area inter-connections. The object of meta-computing systems is not to replace parallel computers, but to extend the parallel programming model for usage within geographically distributed environments. To achieve this, they provide services supporting specific requirements of meta-computing, e.g. including resource management, security protocols, information services, fault-tolerance mechanisms, or communication services. These services are adapted to common problems of distributed resource usage, which include authentication and authorization problems due to different administrative domains, resource management and allocation problems in large environments, or communication problems arising from different latency, bandwidth, and reliability within the grid. Thereby, meta-computing infrastructures lift parallel high-performance computing to a higher level of abstraction by adding services in geographically distributed systems.

In the following, a number of commonly used protocols, tools and programming languages according to the state of the art shall be mentioned that are employed for processing remote procedure calls and exchanging data between an application server and its system environment:

Common Gateway Interface (CGI) scripts on Web servers: CGI is a convention for servers to communicate with local applications. Nowadays, many Web servers are supporting CGI scripts, which are called when a Web server shall return a Web document, but finds that the respective Universal Resource Locator (URL) does not point to a document but to a program. Thereby, gateways handle information requests and return the appropriate document or generate a document on the fly. The returned Web page is then the output generated by that CGI script. Servers capable of displaying information which is not readable by the client, such as a database, act as a "mediator" to produce output which can be displayed by the respective network browser of the client. For writing CGI scripts, a collection of CGI libraries can be used, which provide simple interfaces for parsing and interpreting query strings passed to CGI scripts. However, they also offer rich sets of functions for creating fill-out forms.

Servlets: A servlet is a Java program which can be called by Web servers to produce dynamic Web pages and to provide a functionality similar to CGI scripts. JavaServer Pages (JSP) is an extension of Java Servlet technology for combining Java server-side programs with Hypertext Markup Language (HTML) or Extensible Markup Language (XML), which allows Web developers and designers to rapidly develop and easily maintain information-rich, dynamic Web pages that leverage existing business systems. As part of the Java family, JSP technology enables a rapid development of platform-independent Web-based applications. In order to encapsulate the logic that generates the content for a Web page, JSP technology uses tags and scriptlets written in the Java programming language. In addition, the application logic can reside in server-based resources (e.g. in a JavaBeans component architecture) accessed by the Web page with the aid of said tags and scriptlets. Each formatting tag (HTML or XML) is directly passed back to the response page. By separating the page logic from its design and display and supporting a reusable component-based design, JSP technology makes it faster and easier than ever to build Web-based applications. Together with Java Servlets, that can advantageously be deployed to extend the capabilities of a Web server with minimal overhead, maintenance and support, JSP technology provides an attractive alternative to other types of dynamic Web scripting technologies like Netscape, Server-Side JavaScript (SSJS) or Microsoft Active Server Pages (ASP). It offers platform independence, enhanced performance, separation of the logic from different display types, ease of administration, extensibility into the enterprise and ease of use. Moreover, JSP is not a proprietary technology of any vendor or any particular Web server.

Personal Home Page Hypertext Processor (PHP): PHP is an open-source server-side scripting language, whose code can be embedded within HTML. It allows dynamically creating Web pages depending on user interactions. The overall functionality of PHP can be compared to that of servlets. Its language style is similar to C and Java. Other popular server-side scripting languages which are comparable with PHP are e.g. Active Server Pages (ASP), Perl, ColdFusion, Tool Command Language (TCL), Python, and JSP.

Actions and Action Events (Jakarta Turbine and Struts): The software tool Struts, is part of the Jakarta Project, sponsored by the Apache Software Foundation. In Struts, actions are defined as special classes that are called when a user interaction results in an HTTP URL generated by the client. Thereby, said actions may call other actions. The object of this project is to provide an open-source framework for building Web applications that can be combined with conventional technologies like Java Servlets, JavaBeans, and JavaServer Pages (JSP). Struts encourages application architectures based on the Model-View Controller (MVC) design paradigm. It provides its own controller component and can be combine with other technologies. Moreover, Struts is able to interact with any standard data access technology, e.g. with Java Database Connectivity (JDBC), and works well with JSP, Velocity Templates, Extensible Stylesheet Language Transformations (XSLT), and other presentation systems. The Struts framework provides the invisible underpinnings every professional Web application needs to survive by supporting an extensible development environment for an application based on published standards and proven design patterns. By contrast, Turbine is a servlet-based framework that allows experienced Java developers to quickly build secure Web application. It is developed in an open and participatory environment and released under the Apache Software License. Parts of Turbine can also be used independently of its Web portion as well. Thereby, so-called Action Events extend its possibilities by calling single methods, thus allowing to bundle different code parts in one class.

PROBLEMS ADDRESSED BY THE INVENTION

Notwithstanding their advantages described above, there are several problems conventional scripting languages and software tools according to the state of the art do not solve, e.g. problems that might arise if symbolic steps or method-call-like mechanisms are used to call the next expected step. In the following, these problems and their consequences shall be explained in detail.

Despite the problematic possibilities that the user decides to start another application between two steps and the fact that steps are stateless, the application programmer wants to call the next step that would be started if the application continues in a method-call-like way while retaining the possibility to allow other applications to call some steps. This poses some problems when using solutions for programming steps according to the state of the art. These problems can be categorized according to the need of a call-like mechanism regarding passing parameters, returning a result and nesting step calls.

For example, there might be a number of expected steps that can follow a given step. Some steps are called directly by the given step in the same way as subroutines in a program (direct calling). Other steps depend on specific user interactions; therefore, the programmer of the given step specifies which step should be called in case of which user interaction (indirect calling). Calling steps can be executed by conventional software tools according the state of the art, direct calls by means of a conventional programming language and indirect calls by means of CGI programs, servlets, etc.

For direct and indirect calling, the calling step might want to retain control back and receive a possible return value after the called step is finished (which is called a "gosub" call, in contrast to "goto" calls where returning from the called step to the calling step is not expected). As steps are stateless, this can not happen in a transparent way by using the programming language of a subroutine call, but the calling step has to be called again after the called step has finished indicating this fact and using some data that puts the calling step in the correct state to continue its task and that delivers the possible return value of the called step. For example, a "compose message" step requires an address book step to acquire the receiver of the message. The address book step might also choose to call another step in order to fulfill its task, which leads to a nested call path.

For "gosub" calls, this nesting can only take place as long as the same application is used by the respective user. If during a session in which an application is used the user chooses to switch to another application, the nesting of the step calls of the old application needs to be discarded, and a new nested call path might be built. However, nesting "gosub" calls is not possible when conventional solutions according to the state of the art are employed.

For a direct call the programmer of the calling step wants to specify a set of parameters and, in the case of a "gosub" call, to process the results of the called step. In conventional solutions according to the state of the art, parameters can be passed by using a common session data space. Thus, the state of the art allows passing parameters and returning results for direct calling.

For each of the expected following steps, the programmer of the given step wants to specify a set of parameters and, in some cases, to process the results of calling these steps. In conventional solutions according to the state of the art, step parameters are encoded within the client document (e.g. as HTTP GET or POST parameters), then returned by the client and put together by the system in the common session data space. The part, where these data can then be retrieved by the called step differs from the part where the step retrieves the data passed by another step that would call it directly. Thus, the state of the art allows passing parameters and returning results for indirect calling.

However, the problem here is that the step parameters are encoded within the client document, which results in a number of problems:

First, the memory space for parameters and step names is restricted if the HTTP GET mechanism is used, which often results in a maximum overall length of e.g. 255 characters, If, due to less restrictions, the POST mechanism is used, the usage of JavaScript or something similar is required if more than one adjacent step can be called. Thereby, using JavaScript or similar languages requires the client being able to execute them, which poses severe security problems.

Moreover, only string-representable parameters can be used for GET and POST parameters.

Finally, these mechanisms require a terminal that is able to generate HTTP messages towards the server, such as a Web browser or a Wireless Access Protocol (WAP) browser plus the network-side WAP gateway.

Sometimes, a step programmer wants to specify a following step that he/she does not know yet, but which depends on things like the usage history of the system, or a specification of the current application. Such cases might include the last executed step ("back"), the calling step ("parent step"), the start step of the portal ("main menu"), or the start step of the application ("application main menu").

For example, Struts offers symbolic steps for direct calling of steps, but neither for indirect calls nor is there a possibility to pass parameters to the called steps. Due to the lack of the possibility of nesting "gosub" calls, there is also no means to use symbolic steps that depend on the nesting of calls.

The following table shows that conventional solution according to the state of the art tackle none of the problems described above:

|  | Nested "gosub" Calls | Solution for Problems at Passing Parameters for Indirect Calls | Symbolic Steps |
| --- | --- | --- | --- |
| CGI Scripts | no | no | no |
| Servlets | no | no | no |
| Action/Events | no | no | no |

OBJECT OF THE UNDERLYING INVENTION

In view of the explanations mentioned above, it is the object of the underlying invention to propose a technology that solves the problem of re-using application steps in a uniform way. Furthermore, the inventions deals with the problem of automatically calling these steps according to user interactions in an HTTP-independent way and/or the problem of allowing a nested usage of said steps.

This object is achieved by means of the features of the independent claims. Advantageous features are defined in the dependent claims. Further objects and advantages of the invention are apparent in the following detailed description.

SUMMARY OF THE INVENTION

The underlying invention is basically dedicated to the idea of supporting client/server architectures and distributed processing systems in a distributed computing environment capable of processing multiple, nested, synchronous and concurrent remote procedure calls. In particular, it can pertain to mobile service portals, application servers and transaction systems in heterogeneous telecommunication networks where these application environments are employed.

BRIEF DESCRIPTION OF THE CLAIMS

The independent claim 1 and the claims 2 to 8 are related to a method for dispatching steps of at least one application running on an application server of a service portal in a client/server system of a distributed computing environment which can be accessed from client terminals connected to said service portal, wherein users interact with an application running on a remote application server by selecting user interaction elements on their client terminals with the aid of a client program, interactions are then transmitted to the application server where the main part of said application is executed, and the application creates output that contains the next set of possible user interactions. Thereby, the following steps are performed:

arbitrarily nesting programming commands that are used to call another application step serving as a called subroutine within the calling application step, returning values to the calling application step, and discarding nesting paths of called application steps in case a user switches to another application.

Next, the dependent claim 9 is directed to a service portal for a client/server architecture in a distributed computing environment configured for implementing a method according to anyone of the claims 1 to 8.

Moreover, the dependent claim 10 pertains to a method executed by a request dispatcher, which is integrated in said service portal according to claim 9.

Besides, the dependent claim 11 is directed to a software program running on an application server of a service portal in a client/server system of a distributed computing environment which executes a method according to anyone of the claims 1 to 8.

Finally, the dependent claim 12 refers to a client/server architecture of a distributed computing environment enabling users to indirectly interact with an application running on a remote application server, in which a service portal according to claim 9 configured for implementing a method according to anyone of the claims 1 to 8 is applied.

BRIEF DESCRIPTION OF THE DRAWINGS

Further advantages and possible applications of the underlying invention will become evident from the following description of the preferred embodiment of the invention, which is depicted in the following drawings:

FIG. 5 shows a block diagram that illustrates the overall process of the requested dispatcher working principle according to the underlying invention, and FIG. 6 exhibits three step stack examples for a so-called community/messaging application interaction, wherein the "Community Select User" step is the top element of said stack to be executed first (FIG. 6*a*), the "Compose Message" step is the top element of said stack (FIG. 6*b*) to be executed first, and the "Community Select User" step is again the top element of said stack (FIG. 6*c*) after the removal of the "Compose Message" step by the request dispatcher to be executed first.

DETAILED DESCRIPTION OF THE UNDERLYING INVENTION

In the following, a preferred embodiment of the underlying invention as depicted in FIGS. 1 to 6 shall be explained in detail. The meaning of the symbols designated with reference signs in FIGS. 1 to 6 can be taken from Table 3.

The proposed approach underlying invention refers to a system which is able to split up applications 202*a/b/c* into a number of reusable parts (the steps 109*a-i*). For example, a messaging application is decomposed into a "compose message" step 608 and a "send message" step. Thereby, said system allows to reuse the parts outside of application boundaries. Other applications are free to incorporate those parts into their own overall application flow at any time.

Figure 1:
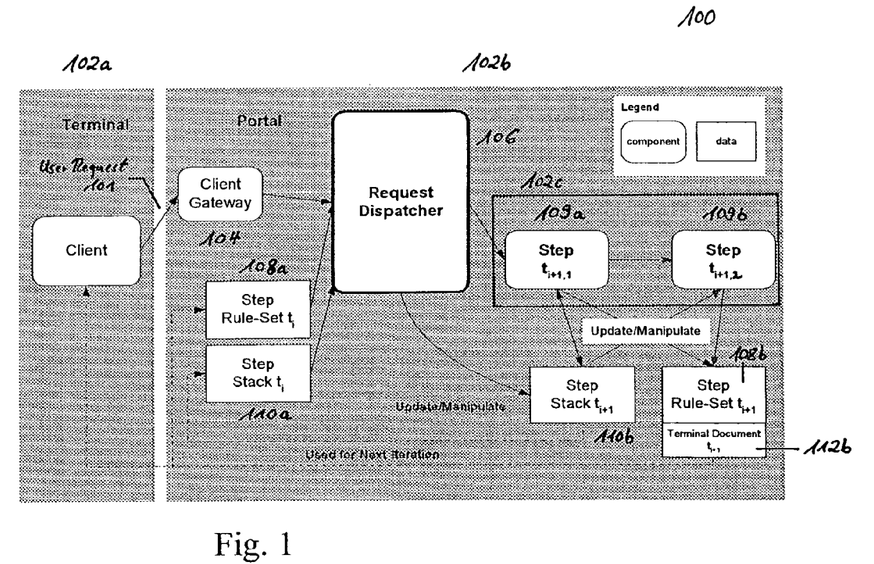
FIG. 1 shows an overview diagram which illustrates the general mechanism for dispatching application steps in a client/server system according to the underlying invention.

A formalized view of the solution is shown in FIG. 1. Herein, it is assumed that before a user interaction can take place a rule set 108*a/b* exists that states which step 109*a-i* with which parameters has to be called in case of different user interactions. This rule set 108*a/b* can either exist explicitly in the system, or it is encoded in the client document (e.g. in case of HTML documents or special client programs), or a combination of both (see Table 1). As shown in FIG. 1, the rule set 108*a* for a certain step i is either created or at least modified by the previous step i-1. In case no rule set 108*a* exists, a default rule set 108*a* is deployed. It should be noted that the action associated with a certain rule is not static and might change according to the respective client context or server context. For example, the entry "id=5" might only be equal to "parameter a=1, b=3" if the user has a certain location but might change it if the situation differs.

TABLE 1

Different Cases for Rule Sets and Client Document Combinations

| | Client Document | Rule Set |
|---|---|---|
| Case 1 | element 1 –> step 1, parameter a = 1, b = 3 element 2 –> BACK, parameter c = 4 | None |
| Case 2 | element 1 –> step 1, id = 5 element 2 –> BACK, id = 6 | id = 5 –> parameter a = 1, b = 3 id = 6 –> parameter c = 4 |

TABLE 1-continued

Different Cases for Rule Sets and Client Document Combinations

| | Client Document | Rule Set |
|---|---|---|
| Case 3 | element 1 -> id = 5<br>element 2 -> id = 6 | id = 5 -> step 1, parameter<br>a = 1, b = 3<br>id = 6 -> BACK, parameter<br>c = 4 |

On the client terminal 102a, the user selects an interaction element (e.g. by pressing a button). The message that is associated with that user interaction is now sent to the client gateway 104 on the server. The message occurs in a client-specific format and is translated into the client-independent format used by the request dispatcher 106. In the first case, the underlying client-specific message already contains the step name and the parameters. In the second case, the client-specific message already contains the step name and an identity number (id). The client gateway 104 replaces this id by the corresponding parameters. In the third case, the client-specific message contains an identity number only. The client gateway 104 replaces this identity number by the corresponding step name and the parameters.

Afterwards, the translated request message is sent to the request dispatcher 106. This message now consists of a pair (step name, parameters). If the pair which has been generated in that way contains a symbolic step name like PARENTSTEP, MAIN MENU, etc., the dispatcher 106 replaces the symbolic step name by a pair from the step stack 110a/b. If PARENTSTEP e.g. denotes the step that called the actual step 109a, the top-of-stack element is fetched and used. If MAIN MENU denotes the top-level step of the system, the complete stack is emptied and the first step name is used.

Now the dispatcher 106 knows a step name and some parameters. It calls the corresponding step 109b using the corresponding parameters. This step is now started. Before the step finishes, it may (but does not need to, see below) create parts of the next client document and the next rule set 108b, so the system knows how to handle the next user interaction. In addition, it can access (i.e. read and/or write) the step stack 110a, thus creating the next step stack state 110b.

Before it is finished, the step 109b can also call other steps 109c (which can, recursively, also call other steps). These steps may also create parts of the client document and the next rule set 108b. The steps to be called can be references either by naming them or by specifying again a symbolic step name like PARENTSTEP or MAIN MENU.

In general, there are two types of calling a step. The first type, "goto", passes the control to the called step and finishes the execution of the calling step. The second type, "gosub", calls the next step, but returns control after the called step has finished. In this case, the calling step can also evaluate possible results the called step might return. In case of a "gosub" call, the calling step is asked for some parameters, and the step name and its parameters are pushed on the stack.

If a step which has been called by a "gosub" call is finished, it specifies the symbolic step name PARENTSTEP, if appropriate. In this case, the first element of the stack is taken from the stack and used for execution (thereby using the parameters this step specified when "gosub"-calling the step to be finished).

The response to the initiating request is then delivered to the client terminal 102a. Finally, the whole process starts again after the user has selected an interaction element.

Using this mechanism, there are two ways to realize an application workflow. The application workflow is the controlling scheme that determines how the steps 109a/b/c of one application 202a relate under the aspect that the application 202a is in one step and the user selects a specific interaction element.

Figure 2:
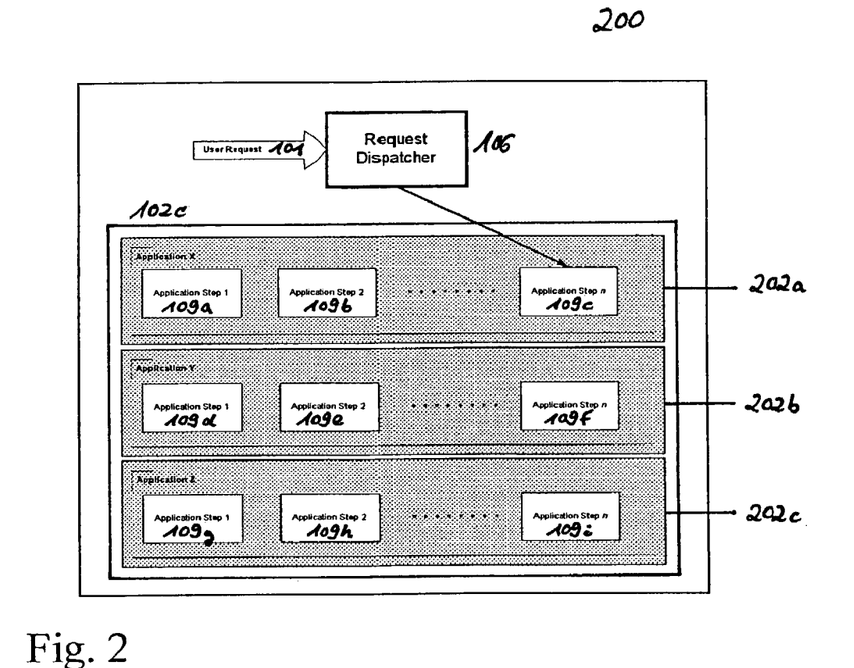
FIG. 2 presents a Distributed Application Workflow scheme for three applications, wherein each step of an application contains the partial workflow determining the next steps that can be reached from this step.

The first way is to employ a Distributed Application Workflow scheme 200 as depicted in FIG. 2 wherein each step contains the partial workflow determining the following steps that can be reached from the current step. In this scheme, a step has to contain workflow parts of multiple applications 202a/b/c if it is used in multiple applications 202a/b/c.

Figure 3:
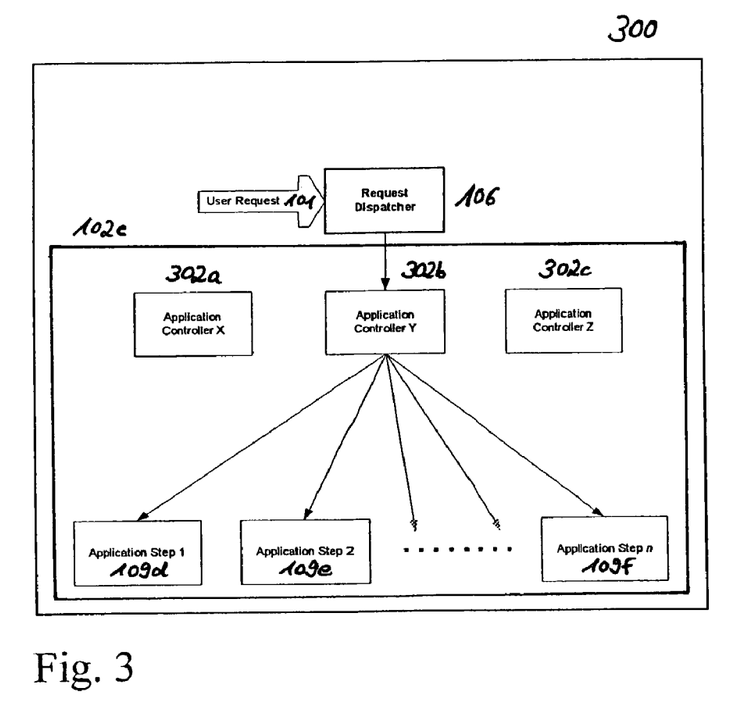
FIG. 3 presents a Central Application Workflow scheme for three applications, wherein the workflow is kept inside a special step, FIG. 4 exhibits a simplified block diagram showing the required system components according to the underlying invention.

The second way is using a Central Application Workflow scheme 300 as depicted in FIG. 3 wherein the workflow is kept inside a special step. In this scheme, during one application 202a always this special step, the application controller 302a/b/c, is called by the request dispatcher 106. The application controller 302a/b/c then calls the adequate step directly. In this scheme, a step does not have to be modified if said step is used in different applications 202a/b/c.

In the following sections, a number of methods shall be proposed which can advantageously be applied to realize the invention. Thereby, an implementation of a step-based system as already introduced in the above section shall be presented. This system uses a pure dispatcher 106 or step structure as shown in FIG. 2 and does not deploy any additional application controller 302a/b/c. Applications 202a/b/c are free to implement this controller on their own if they need it.

Thereby, applications 202a/b/c offer steps to other applications. While an interface is just a collection of method calls without any user interaction, a step may embody more complex functionality that includes user interaction. As an example, the retrieval of some context information from a context service is covered in an interface, while the sending of a message by a messaging service is implemented as a step since it involves user interaction.

Figure 4:
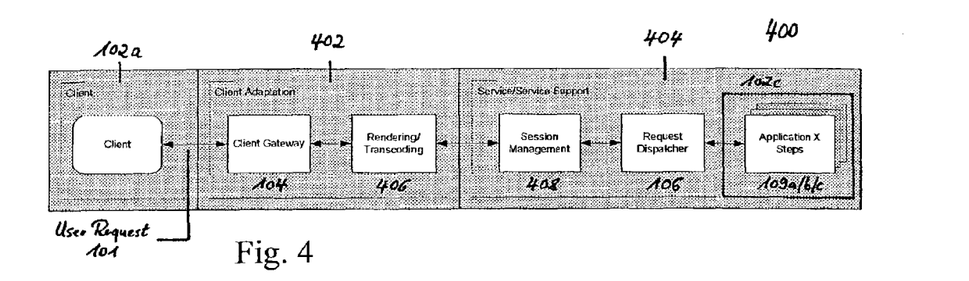
Figure 5:
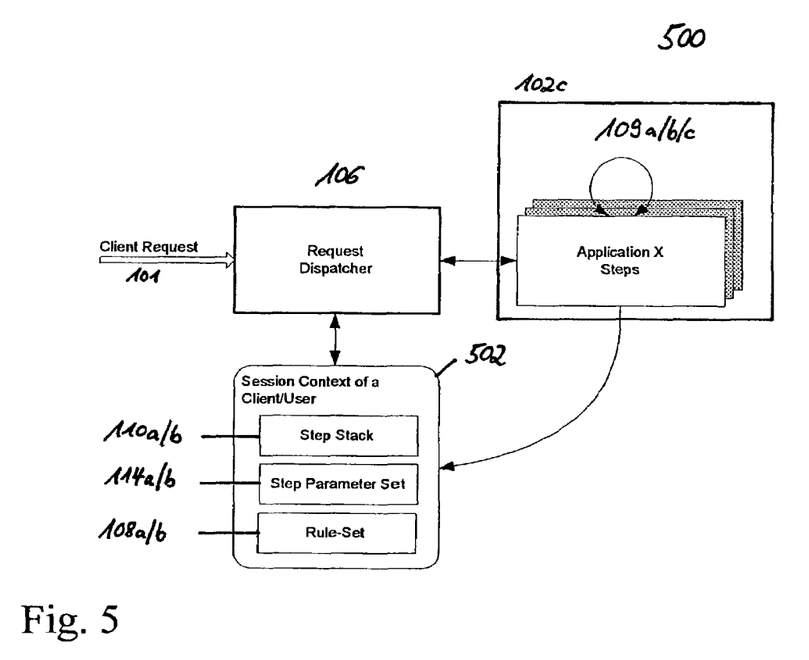

In FIG. 4, all required components are shown. Some interconnections and/or support components were omitted to simplify explanations. Every part and its relations to any other part will be explained in the following.

Client terminal: A client terminal 102a can be any device with communication means towards the system and some output means that can be used for user interaction. There are no other requirements towards this component since any specific adaptation will be performed automatically by the system.

Rendering and transcoding component: The applied rendering and transcoding component 406 is responsible for applying certain transformations to the output of steps to allow their presentation on the client's output means. For example, if the client terminal 102a only supports HTML and images of JPEG format, the rendering and transcoding component 406 will alter the output of the applications 202a/b/c or services to fit this requirement. In this connection, it should be noted that in case a transformation has also be done for information that comes from the client terminal 102a, this is also done within this stage.

Client gateway: Since the rendering and transcoding component 406 will only take care of output adaptation, some additional means for low-level device adaptation has also to be presented. The client gateway 104 is therefore responsible for further refining the output and adapting protocols to allow communication from and towards the client terminal 102a.

Session management unit: In order to be able to find out if an application step 109a/b is still interacting with a certain user and if this interaction is associated with another, already past interaction, some means determining and tracking sessions are required. Consequently, a session management unit 408 is provided that implements this functionality. With every session a session context is associated. This session context provides some means for storing information and is kept persistent throughout the life time of the session itself. Some of the basic application-internal data are stored herein.

Request dispatcher: The request dispatcher 106 receives requests from the client terminal 102*a* after they have passed the client gateway 104 and the rendering and transcoding stage. Hence, incoming requests are in understandable and processible format. The request dispatcher 106 then chooses the next step depending on certain information that is stored about the state of the current session towards the client terminal 102*a* (step stack 110*a/b*, additional step parameter set 114*a/b* and a rule set 108*a/b*) and the request itself to determine which next step to invoke. After that, the appropriate application step 109*a/b* is called, and the response is passed back to the client terminal 102*a*. Of course, steps are free to call other steps or to call service methods to perform a certain task. The overall process is outlined in FIG. 5.

Application steps: The application steps 109*a-i* are the basic building blocks of the visible part of applications 202*a/b/c* (i.e. views). Thereby, a number of semantically adjacent steps 109*a/b/c*—in conjunction with the according service—build an application 202*a*. Steps can be addressed from other steps, thus allowing an easy reuse of software components. A detailed description of the characteristics of steps will be given in the following sections.

Since one step might invoke other steps in order to complete certain tasks, a mechanism is needed that allows to return to the calling instance after completion in case "gosub" calls are applied. For instance, a community/messaging application might invoke a "send message" step and a "compose message" step 608. After the message has been send, the application flow should lead back to the community/messaging application. For that purpose, the request dispatcher 106 maintains a step invocation trace, or, in short, a "step stack 110*a/b*". Whenever a new step is invoked, it is put on top of the stack. If a step needs to reference the parent step, it does so by using a reserved keyword for the reference 116*b*. In case, the request dispatcher 106 encounters this keyword, pops the top element from the stack, and invokes the according step.

Each step might produce output elements and interact with the user. However, since the output is adapted towards the client terminal 102*a* and back again into the system by the processing chain as outlined in FIG. 4, one can abstract from the concrete interaction with the user for the following considerations.

Figure 6A:
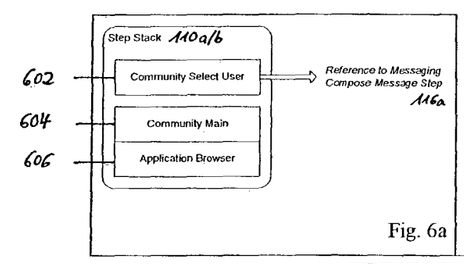
Figure 6B:
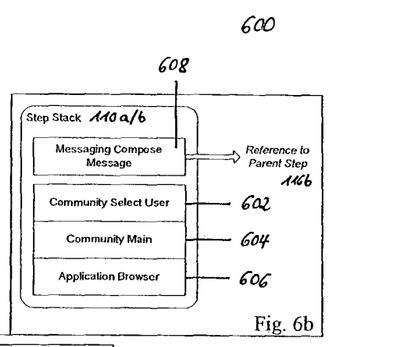
Figure 6C:
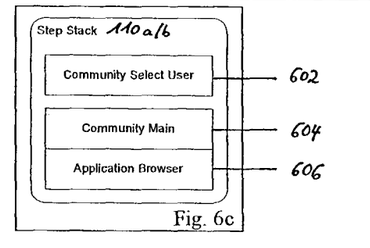

The step stack 110*a/b* for the community/messaging application interaction mentioned above is shown in FIG. 6. Here, a step for selecting certain members of a community wants to use a means for sending a message to the currently selected user. It therefore references a step from the community/messaging application. At this moment, the "Community Select User" step 602 is the top element of the step stack 110*a/b* and therefore the one that is currently executed (FIG. 6*a*). If the user interaction results in a branch to the messaging step, the request dispatcher 106 adapts the step stack 110*a/b* accordingly by making the messaging step the top element in the step stack 110*a/b* and thus the one that has to be executed (FIG. 6*b*). Once the underlying community/messaging application has finished execution and wishes to return to the calling instance, it references the parent step. Since this step does not have any knowledge on which step it has been invoked, it will reference the parent step not by using the parent step name itself but by a reserved keyword that is recognized and accordingly resolved by the request dispatcher 106. In this case, the reference 116*b* to the parent step name will lead to the removal of the top element in the stack by the request dispatcher 106, hence making the "Community Select User" step 602 from the community/messaging application again the top element and therefore the one that is executed (FIG. 6*c*). At this point, the community/messaging application can check the return value of the messaging step to determine if the step execution was successful.

If an error occurs, an adequate output is created either by the request dispatcher 106 or by the step that failed. The request dispatcher 106 can then choose to remove or to re-execute the step on top of the stack. In case of low level, non-application-specific errors (e.g. empty step stack 110*a/b*), the request dispatcher 106 returns to a default state, e.g. the main menu step.

Steps are assumed to be stateless within this embodiment of the underlying invention and are therefore not able to store any information within any internal storage area. To circumvent this shortcoming, a step context is introduced. A step context is a storage area that is kept persistent as long as a step is available within the step stack 110*a/b*. Furthermore, a dedicated step context is only visible to a certain step. Once a step is discarded because it finished execution and is removed from the step stack 110*a/b*, the according step context is also disposed.

Aside from the step-specific step context, there is also an application context available for storing information beyond the life time of the stateless step. The application context is available for the life time of an application 202*a*, which normally exceeds the one of a certain step by far.

In the following sections, technical details of the proposed step implementation, the procedure of resolving different step names, passing and returning values from steps, and the "goto" and "gosub" calling of steps according to the proposed embodiment of the underlying invention shall be described in detail.

Each step is referenced by a unique symbolic name. For each incoming request, the request dispatcher 106 resolves the request string to the according class and invokes a dedicated method in it. Thereby, each step is per definition stateless, which means that it is created for each request and disposed afterwards. This simplifies the implementation to some degree but could also be solved differently in any other systems.

The request dispatcher 106 holds the mapping from symbolic step names to the real implementation of them. In addition there are some symbolic step names (e.g. "PARENT-STEP") that are not mapped directly to a step implementation but assigned to different steps according to the current application's state. Depending on the respective implementation, calling the parent step equals the back functionality in the application flow. For example, if the system puts every step in any case on top of the step stack 110*a/b*, the parent step is equivalent to invoking the previous (back) step. In case a "community step" 604 calls a "compose message" step 608, the "compose message" step 608 will reference the "community step" 604 by "PARENTSTEP" in case it wishes to return to the calling instance. The request dispatcher 106 will resolve this to the step implementation of the parent step without consulting the step to an implementation mapping by simply taking the previous element from the step stack 110*a/b*.

In some cases, it is required to pass parameters and retrieve return values from a step. For instance, for a "compose message" step 608 it is useful to preset a default message and return a status flag indicating if the message delivery was successful or not. For that purpose, the system allows to pass parameters either directly when invoking a step directly by "gosub" or "goto" calls or by setting it indirectly via step-internal methods. The request dispatcher 106 will then take care that the parameter is passed to the next step. The same is true for return values: They can either be returned directly to the calling instance in case of a "gosub" or "goto" call or accessed via step-internal methods. In the latter case, they have accordingly to be set by the request dispatcher 106 to allow later access.

So far, calling other steps was associated with certain user interaction. In some cases, however, it might be useful to call a step directly from within a step to include certain user interface elements or to pass control to another step that should continue with the execution.

Therefore, the system allows two ways to invoke other steps from within one step: "goto" and "gosub" calls. When a step uses a "gosub" call to include another step, the called step is invoked and the control flow is returned afterwards to the calling instance. In case of "goto" calling of another step, the control flow is completely passed to the called step—for example, the called step becomes the top element in the step stack 110a/b and the invoking step is removed from it.

The proposed technology according to the underlying invention can be implemented in any system that supports a request-and-response scheme with the additional possibility to influence the overall process. However, some existing platforms seem to be more suitable than others. In the following, some of these technologies will be introduced, and the benefit of deploying them for implementing the system is outlined.

Java: Java is a platform-independent programming language and application framework developed by Sun. Due to the fact that a number of different platforms are supported, it allows easy integration and other, possibly external steps.

Jakarta Tomcat: Servlets are Java-based frameworks that allow a unified, Web-based application development environment. The reference implementation of a servlet container is the Tomcat engine of the Jakarta Project. Tomcat already implements session management and request processing, thus allowing some basic mechanisms that can be used for implementing the dispatcher 106/step architecture according to the underlying invention.

The main advantageous differences between the herewith proposed approach according to the underlying invention and conventional solutions according to the state of the art can be summarized as follows:

First of all, the invention allows to nest "gosub" calls of steps, to return values to the calling step and to discard nesting paths of called steps in case the user switches to another application 202b.

Furthermore, it allows to pass a large number of binary parameter data when indirectly calling steps from any client terminal 102a that returns a user-interaction-specific identity number to the system.

Finally, it allows step programmers to specify following steps that are expected in a symbolic manner.

TABLE 2

Used Terminology

| Term | Definition |
|---|---|
| "Gosub" Call | If a step calls another step by means of a "gosub" call, the calling step passes the control to the called step and stops. Then the called step is executed. Afterwards, the calling step is executed again, possibly using some execution result of the called step. |
| "Goto" Call | If a step calls another step by means of a "goto" call, the calling step passes the control to the called step and does not expect to get this control back. |
| Application | An application is a program that can be started on a portal by a user, offering some functionality. Applications consist of a number of steps in this invention. |
| Client Program | A client program is any means that allows a user to interact with parts of the applications by executing a client document. Examples for client programs are HTML browsers, WAP browsers, and Java programs. |
| Client Document | A client document is a piece of data that is used by the client to display user interaction elements and other elements like text and graphic. It can contain information like the type and number of the user interaction elements, but also information about how the elements shall look like. |
| Client Terminal | The client terminal denotes the system where the client is executed. It is connected to the application server of a portal by some communication means. |
| Direct Call | If a step calls another step directly, no user interaction decouples the two executions. This call corresponds to procedure calls in programming languages. |
| Indirect Call | If a step calls another step indirectly, the calling step declares that the called step could be started in case of a corresponding user interaction. There might be other steps called due to other user interactions. |
| Portal and Server | A portal or server in this document denotes the role of the system where the applications are executed using the described invention. The application server of a portal is connected to a client terminal by means of a telecommunication network. |
| Step | A step is a part of an application. It may involve side effects (such as storing some data in a file), and/or create some output (in form of parts of the client document). |
| User Interaction Element | A user interaction element allows a user to interact with an application. The result of a user interacting with a user interaction element is a state change that shall initiate a certain behavior of the application. Examples for user interaction elements are buttons, sliders, text fields, menus, keyboard input, and mouse input. |

TABLE 3

Depicted Features and their Corresponding Reference Signs

| No. | Feature |
|---|---|
| 100 | overview diagram which illustrates the general mechanism for dispatching application steps 109a-i in a client/server system according to the underlying invention |
| 101 | user/client request |
| 102a | client terminal connected to the service portal 102b via the Internet and/or any corporate network |
| 102b | (mobile) service portal or transaction system connected to the Internet and/or any corporate network |
| 102c | Web application server of a service portal 102b |
| 104 | client gateway connected to the Internet and/or any corporate network |

TABLE 3-continued

Depicted Features and their Corresponding Reference Signs

| No. | Feature |
|---|---|
| 106 | request dispatcher of the service portal 102b |
| 108a | step rule set at discrete time $t_i$ |
| 108b | step rule set at discrete time $t_{i+1}$ |
| 109a | 1st application step of a first application 202a (X) running on the Web application server 102c at discrete time $t_{i+1}$ |
| 109b | 2nd application step of said first application 202a (X) running on the Web application server 102c at discrete time $t_{i+1}$ |
| 109c | 3rd application step of said first application 202a (X) running on the Web application server 102c at discrete time $t_{i+1}$ |
| 109d | 1st application step of a second application (Y) 202b running on the Web application server 102c at discrete time $t_{i+1}$ |
| 109e | 2nd application step of said second application 202b (Y) running on the Web application server 102c at discrete time $t_{i+1}$ |
| 109f | 3rd application step of said second application 202b (Y) running on the Web application server 102c at discrete time $t_{i+1}$ |
| 109g | 1st application step of a third application 202c (Z) running on the Web application server 102c at discrete time $t_{i+1}$ |
| 109h | 2nd application step of said third application 202c (Z) running on the Web application server 102c at discrete time $t_{i+1}$ |
| 109i | 3rd application step of said third application 202c (Z) running on the Web application server 102c at discrete time $t_{i+1}$ |
| 110a | step stack at discrete time $t_i$ |
| 110b | step stack at discrete time $t_{i+1}$ |
| 112a | terminal document at discrete time $t_i$ |
| 112b | terminal document at discrete time $t_{i+1}$ |
| 114a | step parameter set at discrete time $t_i$ |
| 114b | step parameter set at discrete time $t_{i+1}$ |
| 116a | reference to a "Compose Message" step 608 |
| 116b | reference to the parent step |
| 200 | Distributed Application Workflow scheme for three applications, wherein each step of an application contains the partial workflow determining the next steps that can be reached from this step |
| 202a | first application (X) running on the Web application server 102c |
| 202b | second application (Y) running on the Web application server 102c |
| 202c | third application (Z) running on the Web application server 102c |
| 300 | Central Application Workflow scheme for three applications, wherein the workflow is kept inside a special step |
| 302a | application controller for the first application 202a (X) |
| 302b | application controller for the second application 202b (Y) |
| 302c | application controller for the third application 202c (Z) |
| 400 | simplified block diagram showing the required system components according to the underlying invention |
| 402 | client adaptation block |
| 404 | service and service support block |
| 406 | rendering and transcoding component |
| 408 | session management unit |
| 500 | block diagram that illustrates the overall process of the requested dispatcher working principle according to the underlying invention |
| 600 | three step stack examples for a so-called community/messaging application interaction, wherein the "Community Select User" step 602 is the top element of said stack to be executed first (FIG. 6a), the "Compose Message" step 608 is the top element of said stack (FIG. 6b) to be executed first, and the "Community Select User" step 602 is again the top element of said stack (FIG. 6c) after the removal of the "Compose Message" step 608 by the request dispatcher 106 to be executed first |
| 602 | "Community Select User" step |
| 604 | "Community Main" step |
| 606 | "Application Browser" step |
| 608 | "Compose Message" step |

The invention claimed is:

1. A method for dispatching steps of at least one application running on an application server of a service portal in a client/server system of a distributed computing environment which can be accessed from client terminals connected to said service portal, comprising:
  receiving an input to interact with applications running on a remote application server by receiving an input selecting interaction elements on client terminals with the aid of a client program;
  transmitting interactions, from the client terminals to the application server executing a main part of an application;
  creating, at the application, output that contains the next set of possible interactions, and wherein first application steps can be addressed and invoked by second application steps in order to reuse software components necessary for processing said second application steps;
  nesting, at the application server, programming commands used to call at least one of said second application steps which serves as a called sub-routine within the first application step;
  returning, at the application server, values to the first application step; and
  discarding, at the application server, nesting paths of called application steps in a case of switching to another application.

2. The method of claim 1, wherein parameters are directly passed to at least one of said second application steps to call said second application step when said second application step is invoked directly.

3. The method of claim 2, further comprising:
  indirectly setting parameters via step-internal methods when at least one of said first application steps is invoked, and
  passing said parameters to at least one of said second application steps.

4. The method of claim 3, further comprising:
  directly returning return values to at least one of said first application steps to call a nested application step serving as a subroutine.

5. The method of claim 4, wherein
  return values are accessed via step-internal methods, and
  the request dispatcher sets said return values accordingly to allow later access.

6. A computer readable recording medium storing computer program instructions which cause an application server of a service portal in a client/server system of a distributed computing environment to execute a method according to claim 1.

7. A method for dispatching steps of at least one application running on an application server of a service portal in a client/server system of a distributed computing environment which can be accessed from client terminals connected to said service portal, the method comprising:

receiving an input to interact with applications running on a remote application server by receiving an input selecting user interaction elements on client terminals with the aid of a client program;

transmitting interactions over a telecommunication network to the application server executing the main part of an application;

creating, at the application, output that contains the next set of possible interactions, and wherein first application steps (109a) can be addressed and invoked by second application steps;

nesting, at the application server, programming commands used to call at least one of said second application steps which serves as a called sub-routine within at least one of the first application steps;

returning, at the application server, values to the at least one second application steps;

discarding, at the application server, nesting paths of called application steps in a case of switching to another application; and passing, from the application server, binary parameter data when indirectly calling application steps from any client terminal which returns a user-specific identity number to the system.

8. A computer readable recording medium storing computer program instructions which cause an application server of a service portal in a client/server system of a distributed computing environment to execute a method according to claim 7.

9. A method for dispatching steps of at least one application running on an application server of a service portal in a client/server system of a distributed computing environment which can be accessed from client terminals connected to said service portal, the method comprising:

receiving an input to interact with applications running on a remote application server by receiving an input selecting user interaction elements on client terminals with the aid of a client program, transmitting interactions over a telecommunication network to the application server where the main part of an application is executed;

creating, at the application, output that contains the next set of possible interactions, and wherein first application steps can be addressed and invoked by second application steps;

nesting, at the application server, programming commands used to call at least one of the second application steps which serves as a called sub-routine within at least one of the first application steps;

returning, at the application server, values to the at least one of the first application steps; and discarding, at the application server, nesting paths of called application steps in a case of switching to another application, wherein said method allows for specifying expected subsequent application steps in a symbolic manner.

10. A computer readable recording medium storing computer program instructions which cause an application server of a service portal in a client/server system of a distributed computing environment a method according to claim 9.

\* \* \* \* \*